May 2, 1950

L. A. BAIN, JR., ET AL 2,506,130

METALIZED CERAMIC COATING COMPOSITION

Filed Aug. 14, 1945

INVENTORS
L. A. BAIN, JR.
H. E. MALONE
BY *Harry L. Snuff*
ATTORNEY

Patented May 2, 1950

2,506,130

UNITED STATES PATENT OFFICE 2,506,130

METALIZED CERAMIC COATING COMPOSITION

Lewis A. Bain, Jr., Berwyn, and Herbert E. Malone, Riverside, Ill., assignors to Western Electric Company, Incorporated, New York, N. Y., a corporation of New York Application August 14, 1945, Serial No. 610,844

7 Claims. (Cl. 260—22)

This invention relates to a coating composition for forming a conductive coating on a dielectric base, and more particularly to a composition for forming a metallic coating on a dielectric base such as on mica, ceramic or crystalline bases.

In the manufacture of condensers for electrical apparatus, sheets of mica coated with a metallic composition may be assembled in stacks in such manner that the mica serves as a dielectric between the coatings, which, in turn, serve as the plates of the condenser. In the past, numerous methods have been devised for coating mica for use in such condensers, but difficulty has been experienced in the devising of proper solutions to use as coating materials since materials which may readily be sprayed upon the mica deteriorate on aging, do not form sufficiently rugged coatings that will satisfactorily withstand handling during processing, and do not form extremely thin films with adequate electrical conductivity.

It is an object of the present invention to provide a silver coating solution which may readily be applied to dielectric sheets to provide thin even metallic coatings on the sheets.

Another object is to provide a solution which will air dry rapidly to a tough film, which will give complete coverage of the coated object with a minimum of silver, and which will provide a coating having good electrical conductivity.

In accordance with one embodiment of the invention, a composition suitable for spray coating mica laminations is provided which comprises silver flake and lead-boro-silicate in a suitable vehicle which will rapidly dry in air and which will burn off when the laminations are later subjected to a temperature sufficient to fuse the lead-boro-silicate to form a metallic conducting coating on the mica, which coating consists predominantly of silver bound together by the glass formed from melting the lead-borosilicate. The preferred form of vehicle comprises an oil modified alkyd resin in a solvent to which has been added a dispersion agent.

A complete understanding of the invention may be had by reference to the following detailed description when considered in conjunction with the accompanying drawing wherein there is illustrated the method of coating portions of the surfaces of the mica sheets and wherein Fig. 1 is a face view of a plurality of sheets of mica assembled between cooperating strips of metallic masking material prior to the spraying of the sheets with the silver solution;

Figure 1:
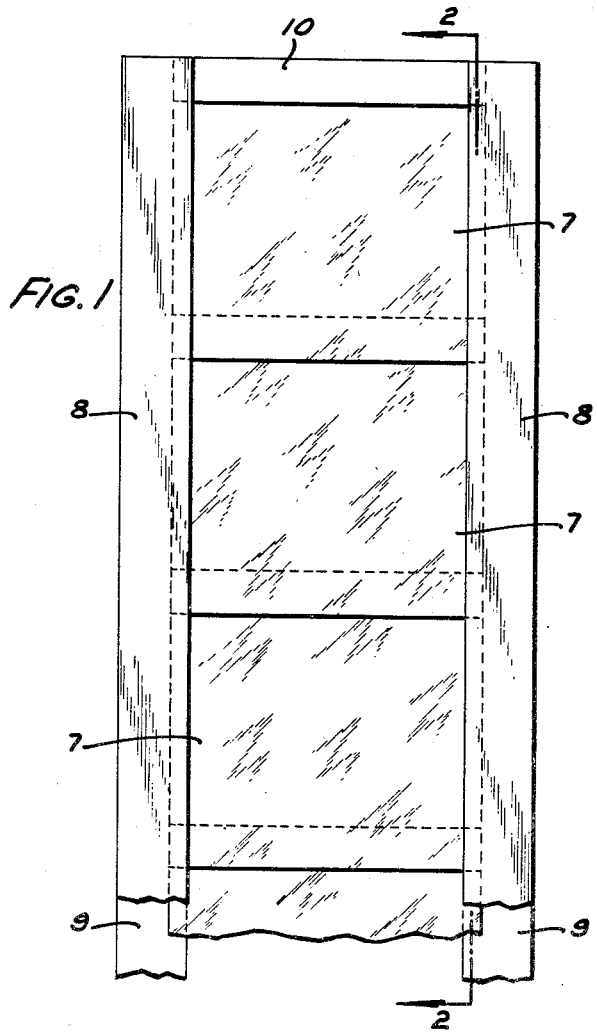

In the drawings, the thickness of the various elements has been materially exaggerated to facilitate the illustration of these parts. For example, the mica sheets which are to be coated are usually approximately .001" thick.

Figure 2:
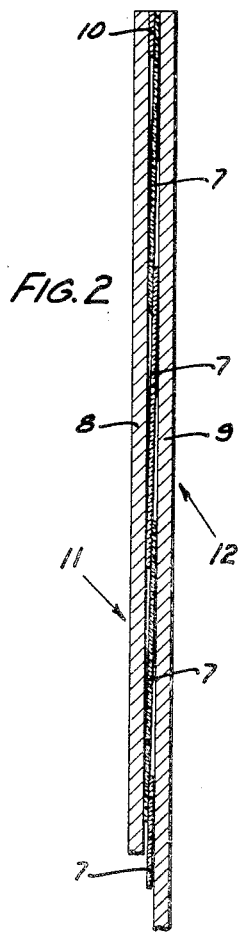
Fig. 2 is a vertical sectional view taken substantially along the line 2—2 of Fig. 1 in the direction of the arrows.

In the process of manufacturing these condenser elements, a plurality of sheets or laminations 7—7 of mica are positioned between copper masking strips 8—8 and 9—9, on which there has been deposited a mineral wax which acts to fix the mica sheets 7 in position with their edges masked under the copper tapes 8 and 9. The upper mica sheet 7 of the assemblage has a strip of masking material 10 along its upper edge and the succeeding sheets are overlapped by the sheet next adjacent them to mask the front upper edge of each sheet of mica, whereas the lower rear edge of each sheet of mica will be masked by the next adjacent lower sheet 7 at the back of the assemblage. The bottom of the assemblage may be masked similarly to the upper end, except that the masking material 10 is placed at the rear of the assemblage, as shown in Fig. 1, the right hand side as shown in Fig. 2. After the mica sheets 7 have been assembled in this manner, a suitable silver solution may be sprayed thereon by directing a spray thereof in the directions indicated by the arrows 11 and 12, whereby there will be no tendency for the solution, when it is sprayed on the mica sheets 7, to get under the masking sections of the mica sheets or the masking tapes.

The solution comprising the preferred embodiment of the present invention is composed of a silver flake material mixed with lead-boro-silicate and carried in a fast drying vehicle which will air dry in a short period of time and which, upon being slowly heated to a temperature sufficiently high to fuse the lead-boro-silicate, will be completely volatilized out of the composition without igniting.

Flakes of silver approximately one micron thick and approximately fifty microns in diameter individually coated with stearic acid are mixed with lead-boro-silicate and a vehicle comprised of an alkyd resin, butyl alcohol, triethanolamine, xylene and toluene in a ball mill and then sprayed onto the surface of the mica held by the masking strips 8 and 9. After the mica sheets have been sprayed and air dried for a short time, they are fired at a temperature sufficiently high to fuse the glass and then cooled to provide the structure shown in Figs. 3 and 4, wherein layers 13 and 14 of substantially pure silver flake bound together by the glass formed from the lead-boro-silicate are fixed to the mica.

The silver flake comprises metallic silver in flake form having a coating of approximately 1.5% stearic acid on its surface. This may be prepared by ball-milling the stearic acid and silver flakes together with mineral spirits until the silver particles are coated with the stearic acid, whereupon the composition may be allowed to dry to remove the solvent.

A preferred form of lead-boro-silicate is the ternary compound $5PbO.SiO_2.B_2O_3$. This compound forms a very low melting point glass which may be fused on the mica sheets without damage to them, and which has a coefficient of expansion similar to that of the mica.

The silver flake and lead-boro-silicate in powder form may be mixed with the other ingredients of the composition in the following proportions:

|  | From | To | Preferably |
|---|---|---|---|
|  | Per cent | Per cent | Per cent |
| Silver flake | 40 | 60 | 45.0 |
| Lead-boro-silicate | 2 | 6 | 2.3 |
| Alkyd Resin, fast air-drying linseed oil modified type | 4 | 15 | 4.5 |
| Butyl alcohol | 3 | 6 | 3.4 |
| Triethanolamine | 0 | 1 | 0 |
| Xylene, or its equivalent | 17 | 4 | 16.3 |
| Toluene, or its equivalent | 34 | 8 | 28.5 |

It has been found that the material known commercially as "Enn Jay No. 1", which is a petroleum derived hydrocarbon solvent with a boiling range between 135° C. and 177° C. and composed mostly of aromatic compounds, is a suitable toluene equivalent and that solvent naphtha is a suitable xylene equivalent and these, together with the butyl alcohol and alkyd resin, comprise a suitable vehicle for the lead-boro-silicate and silver flake.

In the mixing of these ingredients, the alkyd resin, lead-boro-silicate and silver flake are first mixed in a ball mill together with the butyl alcohol and solvent naphtha with approximately one-third of the toluene and, after these have been thoroughly mixed, the balance of the toluene is added to the mixture and mixed therewith.

The alkyd resin, being a fast-drying linseed oil modified type, polymerizes readily, particularly in the presence of silver, which is a catalyst. Therefore, it has been found advisable to add the butyl alcohol to the solution to act as a solvent and to retard the polymerization of the resin. It appears that this butyl alcohol reacts with the resin components to form a soluble resin. The triethanolamine is sometimes added to improve the dispersion of the silver flake in the solution and over the surfaces of the mica since it reacts with the stearic acid on the silver flake to form an organic solvent soluble soap, which is an emulsifying agent. This emulsifying agent causes any agglomerates of the silver flake to break up easily and distribute themselves uniformly over the surface of the mica sheets.

Figure 3:
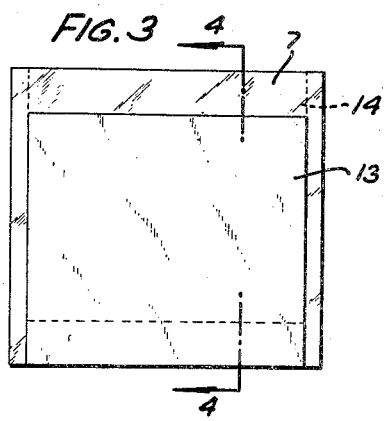
Fig. 3 is a plan view of one of the mica sheets after it has been coated with the silver solution.
Figure 4:
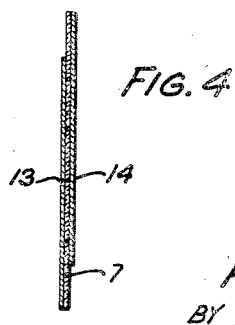
Fig. 4 is a sectional view taken substantially along the line 4—4 of Fig. 3 in the direction of the arrows showing the layers of silver on the mica sheet.

After the mixture has been prepared, it may be sprayed upon the sheets of mica 7 assembled in the masking strips 8 and 9 by directing the spray in the directions shown by the arrows 11 and 12 and, after allowing the coating material to air dry for approximately five minutes, the assembled sheets and masking strips may either be passed through a conveyor type furnace or placed in a box type furnace and raised to a temperature of 1000° F. to 1100° F. and maintained at that temperature for approximately from two to five minutes. In the air drying of the coating, the solvents volatilize and in the firing operation, the alkyd resin volatilizes out prior to the melting of the lead-boro-silicate. Since the mineral wax and alkyd resins are not miscible, the silver solution will be deposited over the entire exposed area of the mica sheets, but will not tend to seep under the masking strips. The mineral wax, of course, will be burned or volatilized out in the furnace, and as soon as the coated mica sheets cool to a temperature below the melting point of the glass, the assemblages of sheets and masking strips may be removed from the furnace and the masking strips may be pulled from the mica, thus providing condenser members as shown in Figs. 3 and 4, wherein the silver coatings 13 and 14 extend to opposite edges of the sheet of mica on opposite sides thereof.

What is claimed is:

1. A coating composition for coating mica sheets consisting of silver flakes coated with stearic acid from 40% to 60%, low melting point lead-boro-silicate from 2% to 6%, drying oil modified alkyd resin from 4% to 15%, butyl alcohol from 3% to 6%, triethanolamine in an amount up to 1%, xylene from 17% to 4%, and toluene from 34% to 8%.

2. An electrically conducting coating composition consisting of stearic acid coated silver flake and vitrifiable particles of lead-boro-silicate dispersed in a volatile liquid vehicle, the stearic acid comprising by weight approximately 1.5% of the coated silver flake, the proportions by weight of silver flake to the lead-boro-silicate being between 60 to 2 and 40 to 6, said vehicle consisting of a drying-oil modified alkyd resin binder in proportion by weight to said coated flake between 4 to 60 and 15 to 40, a solvent of xylene and toluene for said resin binder, the proportions by weight of said toluene to said resin being between 34 to 4 and 8 to 15, the proportions by weight of said xylene to said resin being between 17 to 4 and 4 to 15, butyl alcohol in the proportions by weight to said resin between 3 to 15 and 6 to 4 for retarding the polymerization of said resin, and triethanolamine in an amount up to 1% by weight of said composition for reacting with the stearic acid to form an emulsifying dispersing agent.

3. A silver coating composition consisting of stearic acid coated silver flake and vitrifiable particles of lead-boro-silicate dispersed in a volatile liquid vehicle, the stearic acid comprising by weight approximately 1.5% of the coated flake, and the proportion by weight of the coated silver flake to the lead-boro-silicate being between 60 to 2 and 40 to 6, said volatile liquid vehicle consisting of drying-oil modified alkyd resin in proportion by weight to said coated flake between 4 to 60 and 15 to 40, butyl alcohol in proportion by weight to said flake between 3 to 60 and 6 to 40, xylene in proportion by weight to said flake between 17 to 60 and 4 to 40, and toluene in proportion by weight to said flake between 34 to 60 and 8 to 40, to which is added triethanolamine in an amount up to 1% by weight of said composition to react with the stearic acid to form an organic-solvent soluble soap for dispersing the silver flake through the solution.

4. An electrically conducting coating composition for coating dielectric sheets consisting of silver flakes coated with stearic acid from 40% to 60%, low melting point lead-boro-silicate from 2% to 6%, drying oil modified alkyd resin from 4% to 15%, butyl alcohol from 3% to 6%, triethanolamine in an amount up to 1%, a solvent selected from the group consisting of xylene and solvent naphtha from 17% to 4%, and from 34% to 8% of another solvent selected from the group consisting of toluene and petroleum derived hydrocarbon with a boiling range between 135° C. and 177° C. and composed mostly of aromatic compounds, the stearic acid on the flakes comprising by weight approximately 1.5% of the coated silver flakes.

5. An electrically conducting coating composition for coating dielectric sheets consisting of silver flakes coated with stearic acid from 40% to 60%, low melting point lead-boro-silicate from 2% to 6%, drying oil modified alkyd resin from 4% to 15%, butyl alcohol from 3% to 6%, triethanolamine in an amount up to 1%, xylene from 17% to 4%, and from 34% to 8% of petroleum derived hydrocarbon solvent with a boiling range between 135° C. and 177° C. and composed mostly of aromatic compounds.

6. An electrically conducting coating composition for coating dielectric sheets consisting of silver flakes coated with stearic acid from 40% to 60%, low melting point lead-boro-silicate from 2% to 6%, drying oil modified alkyd resin from 4% to 15%, butyl alcohol from 3% to 6%, triethanolamine in an amount up to 1%, solvent naphtha from 17% to 4%, and toluene from 34% to 8%.

7. A coating composition for dielectric sheets consisting of silver flakes coated with stearic acid from 40% to 60%, low melting point lead-boro-silicate from 2% to 6%, drying oil modified alkyd resin from 4% to 15%, butyl alcohol from 3% to 6%, triethanolamine 1%, xylene from 17% to 4%, and toluene from 34% to 8%.

LEWIS A. BAIN, Jr.
HERBERT E. MALONE.

REFERENCES CITED

The following references are of record in the file of this patent:

UNITED STATES PATENTS

| Number | Name | Date |
|---|---|---|
| 2,375,348 | Cohen | May 8, 1945 |
| 2,385,580 | Knox | Sept. 25, 1945 |

OTHER REFERENCES

Mattiello, "Protective and Decorative Coatings," John Wiley and Sons, N. Y. (1942), vol. 2, page 587.